United States Patent Office 2,825,723
Patented Mar. 4, 1958

2,825,723

PROCESS FOR THE PRODUCTION OF DERIVATIVES OF POLYETHYLENES OF HIGH MOLECULAR WEIGHT

Albert Ballauf, Leverkusen, and Ferdinand Münz and Otto Bayer, Leverkusen-Bayerwerk, Germany, assignors to Farbenfabriken Bayer Aktiengesellschaft, Leverkusen, Germany, a corporation of Germany No Drawing. Application July 14, 1955
Serial No. 522,179

Claims priority, application Germany July 16, 1954

7 Claims. (Cl. 260—94.9)

This invention relates to derivatives of polyethylenes of high molecular weight and to a process for their production.

It is an object of the present invention to provide a process for the production of derivatives of polyethylenes of high molecular weight, which contain reactive groups. A further object is to provide a process for the production of derivatives of polyethylene of high molecular weight which are substituted by succinic anhydride and halogen. Still another object is to provide compounds which can be used as starting materials for novel plastics. More objects will appear hereinafter.

These objects are attained in accordance with the present invention by reacting polyethylenes with a halogen in the presence of maleic anhydride in an inert diluent.

By this reaction instead of the exclusive chlorination of the polyethylene also reaction of the polyethylene with maleic anhydride takes place thus resulting a chlorine containing polyethylene substituted by succinic anhydride radicals. This discovery is surprising, in that substances of high molecular weight usually react not so readily. Moreover, it could also not be expected that the method of carrying out the reaction necessary, in this case i. e. with a substance in the form of a strongly diluted solution, would lead to worthwhile conversion of the starting material.

Examples of polyethylenes of high molecular weight within the meaning of the present invention are the linear and branched polyethylenes of various molecular weights which can be obtained by polymerizing ethylene, if desired in admixture with other olefines and which are still soluble in the inert diluents used.

As inert diluent there may be used those diluents which do not react with the compounds used for the reaction of the invention, for example carbon tetrachloride and hexachloroethane.

The process of the invention can, for example, be carried out by treating a solution or suspension of polyethylene in an inert solvent at elevated temperature with a halogen in the presence of maleic anhydride. It is recommended that the said anhydride be used in excess.

Since the velocity of the reaction can be increased by irradiation with light, it is desirable to work in glass or quartz vessels which are exposed to sunlight or are irradiated by means of a suitable light source, such as, for example, a mercury vapor lamp. It is obvious that, instead of light-permeable vessels, it is also possible to use any other suitable reaction vessels which are provided with quartz windows or immersion lamps.

In addition to light, certain chemical substances are also capable of accelerating the reaction. Examples of such substances which act as catalysts in the process of the invention are oxygen-containing compounds of a peroxide-like nature, such as benzoic acid peroxide, further lead tetraalkyls and also certain azo and hydrazo compounds, e. g. azo diisobutyric acid dinitrile.

By using different amounts of halogen and of maleic anhydride it is possible to produce polyethylenes which are substituted to different degrees and have different physical properties.

The chlorine-containing alkyl succinic anhydrides, which are formed in the process of the present invention can be converted in known manner into functional derivatives. For example, semi-esters can be obtained by reaction with alcohols, such as, for example, methyl alcohol or stearyl alcohol, and semi-amides by reaction with amines, such as, for example cyclohexylamine.

The invention renders possible the production of derivatives of polyethylene which are able to undergo cross-linking owing to their content of reactive groups and consequently can serve as starting materials for novel forms of plastics.

The following examples further illustrate the invention, without, in any way, limiting it.

*Example 1*

20 grams of maleic anhydride are dissolved in 1 litre of a 5% solution of a polyethylene having an average molecular weight of about 20,000 and 30 grams of chlorine are introduced within a period of about 6 hours with irradiation and at the boiling point of carbon tetrachloride. After driving off the solvent by means of steam, and after thorough washing with water and drying, a viscous rubber-like substance is left which contains, as well as approximately 30% of chlorine, such an amount of carboxyl groups that the equivalent weight is about 1000. Alternatively, if the solvent is evaporated in vacuo without using steam and if the remaining substance is heated for a relatively long time in vacuo, it is also possible for the anhydride to be obtained as such.

*Example 2*

Chlorine is introduced at 70–80° C. into a solution of 500 parts by weight of a polyethylene with an average molecular weight of 20,000 in 5,000 parts by volume of carbon tetrachloride until the chlorine content of the polyethylene is about 25%. 100 parts by weight of maleic anhydride is then added to the solution and a further 500 parts by weight of chlorine are introduced at the boiling temperature of the carbon tetrachloride over a period of 15 hours and with irradiation. After removal of the solvent by blowing with steam, thorough washing of the residue with water and methyl alcohol and drying, a viscous rubber-like product remains which has a content of 38.5% of chlorine and 3.45% of carboxyl groups, so that the equivalent weight of the polyethylene containing chlorine and carboxyl groups is about 1300.

*Example 3*

10 parts by weight of maleic anhydride are dissolved in 500 parts by volume of a 10% solution of a polyethylene having an average molecular weight of 20,000, and 130 parts by weight of bromine are run in over a period of 8 hours while heating and with irradiation. In order to drive off a portion of the bromine which has not reacted, the mixture is heated for a further 10 hours without irradiation and then the solvent is evaporated. After washing, there remains a mass which is dark brown in colour with a bromine content of 50.4% and a carboxyl group content of 3.1% from which an equivalent weight of 1450 is calculated.

*Example 4*

600 parts by weight of a polyethylene having an average molecular weight of about 20,000 are dissolved in 6000 parts by volume of carbon tetrachloride. Into this solution chlorine is introduced at the boiling point of carbon tetrachloride while the reaction mixture is irradiated. As soon as the chlorine content of the polyethylene is about 15 percent, 60 parts by weight of maleic anhydride are added and a further amount of about 400 parts by weight of chlorine are introduced within a period of about 12 hours under the same reaction conditions. A sample from this reaction mixture A is worked up by evaporating the solvent and washing the residue with water and methyl alcohol. Thus, a tenacious rubber-like substance is obtained which contains, as well as approximately 30 percent of chlorine, such an amount of carboxyl groups that the equivalent weight is about 2000.

From the above reaction mixture A novel plastics can be obtained, for example by adding 200 parts by weight of N-dibutyl-amine and evaporating the solvent by means of steam after allowing the reaction mixture to stay for some time. Thus, a tenacious rubber-like substance is obtained which is treated in a kneader while washing with water and methyl alcohol. The dibutyl-amidoalkyl-succinic acid thus obtained as a flocculent substance contains about 28 percent of chlorine and such an amount of carboxyl groups that the equivalent weight is about 1000.

A mixture of 100 parts by weight of this dibutyl-amidoalkyl-succinic acid and 20 parts by weight of magnesium oxide, furthermore filling material and, if desired, usually for the production of rubber goods applied additives, are treated in a rolling mill for about 90 minutes at a steam pressure of about 4 atmospheres. Thus a rubber-like substance is obtained which exhibits an excellent strength and elasticity which is very durable against atmospheric influences and solvents.

We claim:

1. A process for the production of polyethylene derivatives containing halogen and dicarboxylic acid anhydride groups, which comprises reacting polyethylene simultaneously with a halogen selected from the group consisting of chlorine and bromine and with maleic anhydride, and recovering the polyethylene derivative formed.

2. A process for the production of polyethylene derivatives containing halogen and dicarboxylic acid anhydride groups, which comprises reacting polyethylene simultaneously with a halogen selected from the group consisting of chlorine and bromine and with maleic anhydride, and a free radical-forming catalyst, and recovering the polyethylene derivative formed.

3. A process for the production of polyethylene derivatives containing halogen and dicarboxylic acid anhydride groups, which comprises reacting polyethylene simultaneously with a halogen selected from the group consisting of chlorine and bromine and with maleic anhydride in the presence of actinic radiation, and recovering the polyethylene derivative formed.

4. A process according to claim 3, wherein the reaction is carried out in the presence of an inert diluent.

5. A process according to claim 4, wherein the reaction is carried out in the presence of a free radical-forming catalyst.

6. Process according to claim 2 in which said free radical forming catalyst is a member selected from the group consisting of peroxides, lead tetra alkyls, azo compounds and hydrazo compounds.

7. A polyethylene derivative formed by reacting polyethylene simultaneously with a halogen selected from the group consisting of chlorine and bromine and with maleic anhydride.

References Cited in the file of this patent

UNITED STATES PATENTS

| | | |
|---|---|---|
| 2,503,252 | Ernsberger | Apr. 11, 1950 |
| 2,634,256 | Sparks et al. | Apr. 7, 1953 |